(12) United States Patent
DeTitta

(10) Patent No.: US 11,416,898 B2
(45) Date of Patent: *Aug. 16, 2022

(54) METHODS, SYSTEMS, AND APPARATUS FOR FINANCING PROJECTS

(71) Applicant: John E. DeTitta, Fairport, NY (US)

(72) Inventor: John E. DeTitta, Fairport, NY (US)

( * ) Notice: Subject to any disclaimer, the term of this patent is extended or adjusted under 35 U.S.C. 154(b) by 676 days.

This patent is subject to a terminal disclaimer.

(21) Appl. No.: 16/422,106

(22) Filed: May 24, 2019

(65) Prior Publication Data

US 2019/0279259 A1 Sep. 12, 2019

Related U.S. Application Data

(63) Continuation of application No. 14/015,604, filed on Aug. 30, 2013, now Pat. No. 10,325,290, which is a
(Continued)

(51) Int. Cl.
*G06Q 30/00* (2012.01)
*G06Q 30/02* (2012.01)

(52) U.S. Cl.
CPC ......... *G06Q 30/0273* (2013.01); *G06Q 30/02* (2013.01)

(58) Field of Classification Search
CPC .................. G06Q 30/0273; G06Q 30/02–0277
See application file for complete search history.

(56) References Cited

U.S. PATENT DOCUMENTS

2002/0049816 A1* 4/2002 Costin, IV ......... G06Q 30/0601 705/26.1

FOREIGN PATENT DOCUMENTS

WO WO-2016118843 A1 * 7/2016 ......... G06Q 30/0201

OTHER PUBLICATIONS

Online fund-raising malls :fund raising goes high-tech; Raddatz, Dick; Fund Raising Management ;Jun. 2000; 31, 4;p. 12Jun. 2000. (Year: 2000).*

(Continued)

*Primary Examiner* — Raquel Alvarez

(57) ABSTRACT

A method of producing and financing a predetermined project is disclosed. In an embodiment, the method comprises the steps of selecting a project and developing a budget for the project, and developing a marketing plan which is comprised of a plurality of advertising buys, each of the plurality of advertising buys being targeted toward a corresponding one of a plurality of advertisers. Further, there is a set of advertising materials that are targeted toward a corresponding one of the plurality of advertisers. The subject matter of the selected project relates to the interests of at least one of the plurality of advertisers, the cost of developing the marketing plan and the set of advertising materials not exceeding the developed budget. The next step presents to at least one of the plurality of advertisers the cost of the budget and the advertising material of at least one of the plurality of advertising buys, each of the plurality of advertising buys may require a predetermined number of impressions to be completed. Further, if the at least one advertising buyer purchases the at least one advertising buy, the advertising materials are produced and placed on a media property. For at least one of the plurality of advertising buys, the number of impressions to which at least one user is exposed on the on media property are counted, thereby completing the one advertising buy when the counted number of impressions equals its buy's predetermined number of impressions. Finally, the revenue from the completed advertising buy is collected and the selected revenue produced by the completed advertising buy is placed into a media production fund.

20 Claims, 2 Drawing Sheets

Figure 1:
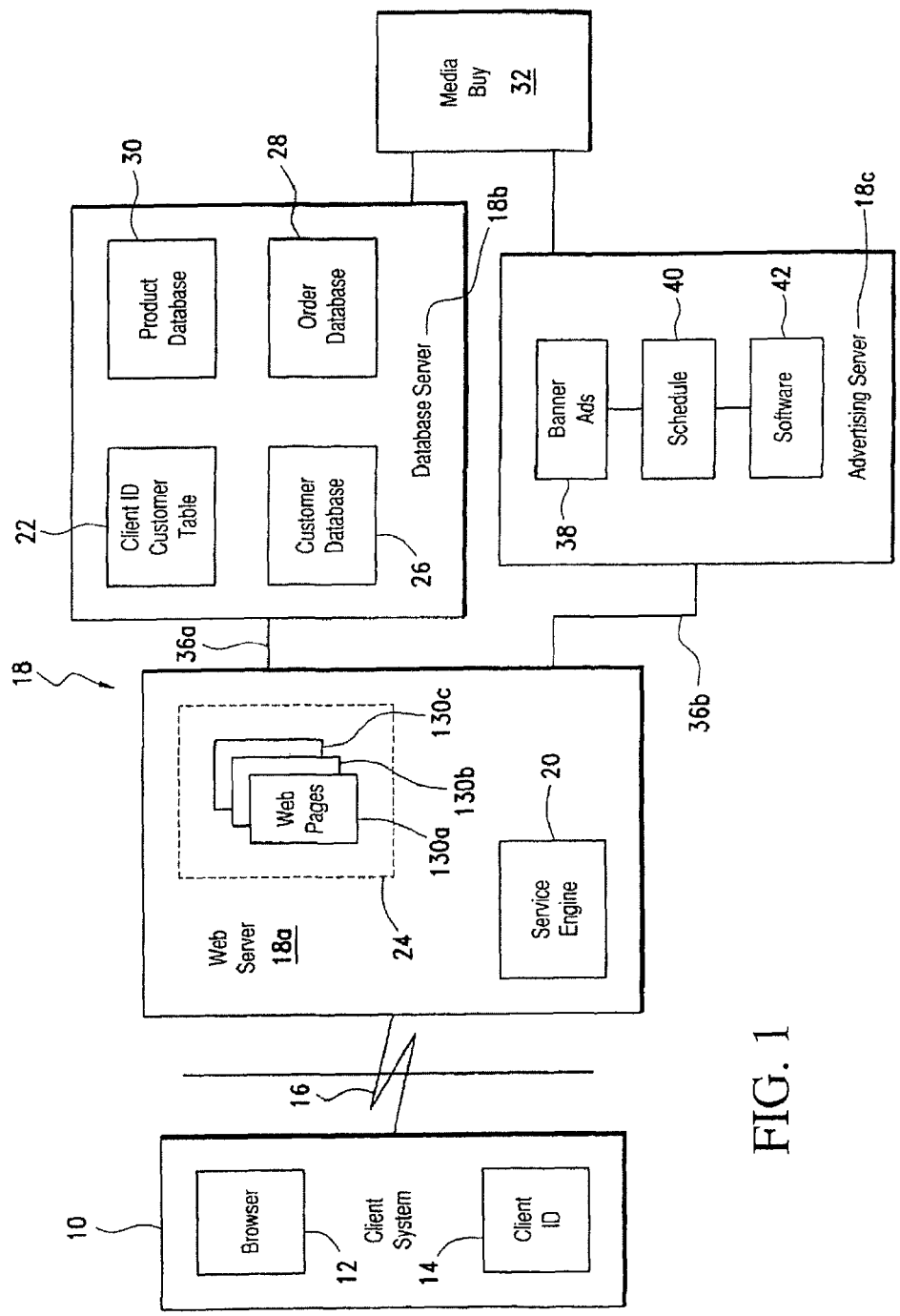

Related U.S. Application Data continuation-in-part of application No. 11/274,706, filed on Nov. 14, 2005, now abandoned.

(60) Provisional application No. 60/626,933, filed on Nov. 12, 2004.

(56) References Cited

OTHER PUBLICATIONS

Kaplan, K. (Aug. 28, 2000) Monday Business; republicans work for change with E-commerce site; web: RepublicanShopping.com takes political fund-raising into new territory by offering goods online and getting a cut of profit. : Home edition. Los Angels Times. (Year: 2000).*

ZDNet donates $1 million dollars in advertising availabilities to benefit tomorrows children fund. (Dec. 22, 1999) PR Newswire.*

* cited by examiner

METHODS, SYSTEMS, AND APPARATUS FOR FINANCING PROJECTS

CROSS-REFERENCE TO RELATED APPLICATION

This application is a continuation of U.S. application Ser. No. 14/015,604, filed Aug. 30, 2013, titled "Methods, Systems, and Apparatus for Financing Projects", which is incorporated by referenced herein in its entirety, which is a continuation in part of U.S. application Ser. No. 11/274,706, filed Nov. 14, 2005, titled "Method and Apparatus for Producing and Financing Media Productions", which is incorporated by reference herein in its entirety, and which claims the benefit of priority of U.S. Provisional Application No. 60/626,933, filed Nov. 12, 2004, titled "AdFilmTies Film Financing Process", which is incorporated by reference herein in its entirety.

FIELD OF THE INVENTION

The present invention relates generally to media financing and more specifically it relates to such a process that allows advertisers to finance media productions through advertising media buys while eliminating the risk of normal event financing speculative investment. Besides media productions, other projects that may be financed using the present invention include non-profit related project, a business related project, a cause-related project, a real-estate related project and an art related project.

BACKGROUND OF THE INVENTION

There are many instances in today's marketplace of having to raise money to fund a desired project. Such projects may be in the form of various new business projects and ventures including, but not limited to, non-profit projects, cause-related projects, real-estate projects and projects related to the arts. Historically people needing to raise money for such projects have had to turn to using personal funds, charitable contributions of others, government grants, bank and other third party loans and investors which expect a return on their investment. Due to the limited pool of grant money, the number of prospective donors having cash available and the uncertainty of the ultimate success of many of these projects which may deter the banks and investors, fund raising is notoriously difficult.

With the continuing popularity and use of social media for business purposes, there has developed new types of fund raising mediums such as "crowd funding", for example, which allows projects to be listed on a crowd funding internet site such as "Kickstarter.com". In this methodology, anyone with an internet connection can donate their money to the project of their choice. As stated m Wikipedia (http://en.wikipedia.org/wiki/Crowd_funding#Pros_and_cons):

"Crowdfunding (alternately crowd financing, equity crowdfunding, crowd-sourced fundraising) is the collective effort of individuals who network and pool their money, usually via the Internet, to support efforts initiated by other people or organizations.[1][2] Crowdfunding is used in support of a wide variety of activities, including disaster relief, citizen journalism, support of artists by fans, political campaigns, startup company funding,[3] motion picture promotion,[4] free software development, inventions development, scientific research,[5] and civic projects.", and "Crowdfunding can also refer to the funding of a company by selling small amounts of equity to many investors. This form of crowdfunding has recently received attention from policymakers in the United States with direct mention in the JOBS Act; legislation that allows for a wider pool of small investors with fewer restrictions.[2] While the JOBS Act awaits implementation, hybrid models, such as Mosaic Inc., are using existing securities laws to enable the public in approved states to invest directly in clean energy projects as part of a crowd.", and "Crowdfunding has its origins in the concept of crowdsourcing, which is the broader concept of an individual reaching a goal by receiving and leveraging small contributions from many parties. Crowdfunding is the application of this concept to the collection of funds through small contributions from many parties m order to finance a particular project or venture."

Since this is such a new area of internet commerce, as noted by Wikipedia, legislation is still developing in this area in an attempt to put some controls over the process which may limit the availability of this methodology as a potential funding source for many people.

Furthermore, this methodology relies on people willing to donate their own money to the project which makes it difficult to raise money especially if the project is not emotionally appealing to a large population of potential contributors.

Due to the above described limitations of existing fund raising methodologies, there remains a need for an improved method, system and apparatus for raising funds for projects.

SUMMARY OF THE INVENTION

It is an object of the present invention to provide a project funding method, system and apparatus that will overcome the shortcomings of current methodologies, systems and systems.

It is a further object of the present invention to provide a process for raising funds for a predetermined project which utilizes an advertiser funding model which eliminates the requirement for traditional fund raising systems which rely on charitable contributions of the consumer, expect a return on investment, are limited in availability (e.g., grants), or otherwise have inherent risk associated with the success of the project.

It is yet a further object of the invention to provide a fund raising method, system and apparatus which does not rely on charitable contributions by third parties directly into the fund, yet allows the third party to participate in the building of the desired fund by accessing the media outlets and properties attributed to an advertiser's media buy which is linked to the selected project.

Other objects and advantages of the present invention will become obvious to the reader and it is intended that these objects and advantages are within the scope of the present invention.

The media outlet may be selected from a group comprising a website, newspaper, telephone directory, radio or television, for example.

The project may be selected from a group comprising a non-profit project, a business project, a cause-related project, a real-estate project and an art related project, for example.

In yet another aspect of this invention, the project may be presented to produce added value advertising selected from the group comprising product placement, public relations, branded entertainment or other merchandising and other project related associations all or some of which may be included in the standard media buy.

In a still further aspect of this invention each of the media properties/advertising materials 1s selected from a group comprising an internet banner advertisement, print advertisement, radio advertisement or television advertisement.

DESCRIPTION OF THE DRAWING FIGURES

Figure 2:
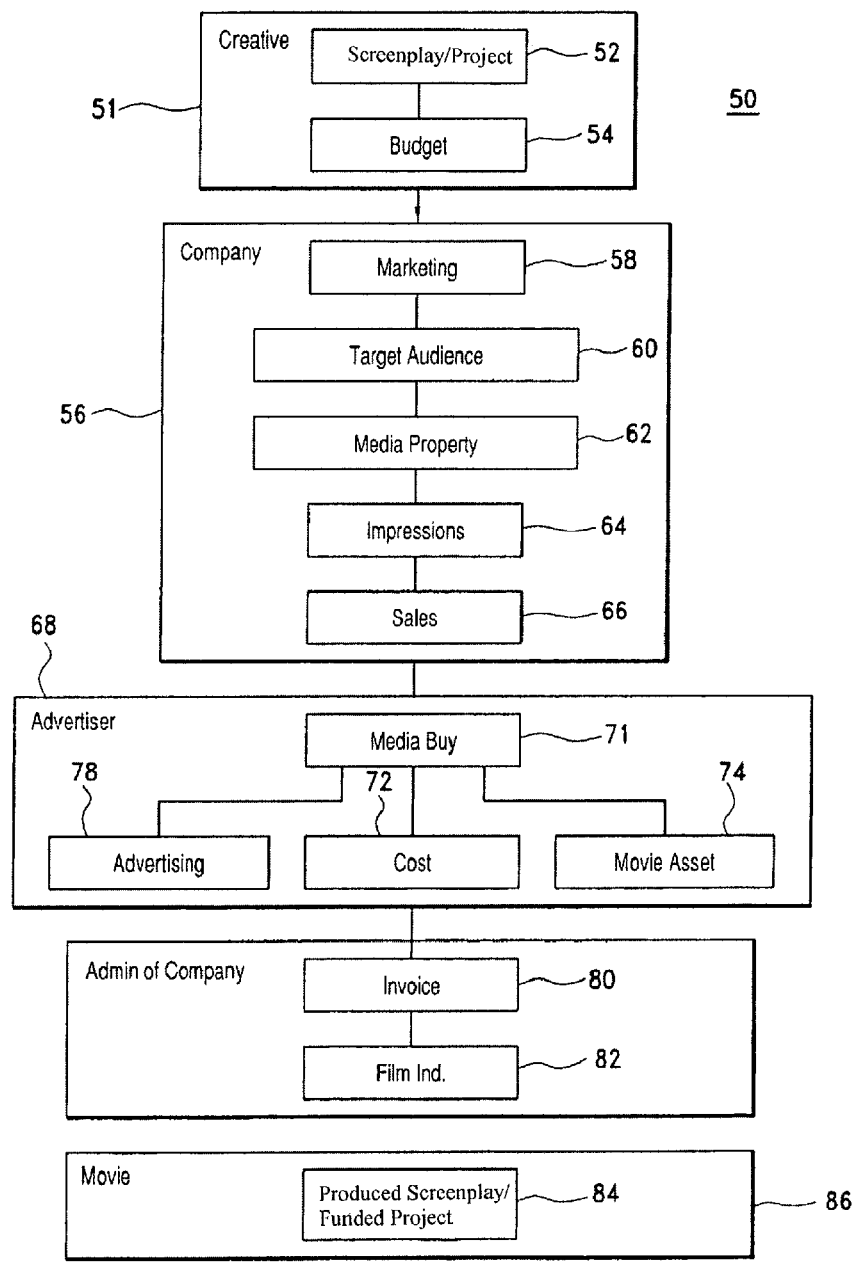

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which:

FIG. 1 is a functional block diagram illustrating how a user's browser and a server of the website to be accessed by the user's browser are connected to and by a communication link to each other; and FIG. 2 is a flow diagram of the process of financing a project in accordance with the teaching of the present invention.

DETAILED DESCRIPTION OF A PREFERRED EMBODIMENT

Referring now to the drawings and in particular to FIG. 1, there is shown an embodiment of this invention which permits a browser or user, using his/her client system 10 to access a server system 18 by exchanging messages over a communication link 16. In one illustrative embodiment of this invention, it may take the form of the Internet. The client system 10 comprises of a browser 12 and its assigned client identifier, which is known as a "cookie". The client identifier is stored in a file 14. Though only a single client system 10 is illustrated in FIG. 1, it will be appreciated that there would typically be a plurality of client systems 10, which are connected by a communications link 16 to the server system 18. In one illustrative embodiment of this invention, the user initiates on the browser 12 a communications session with the server system 18 by assigning and sending over the link 16 his/her client identifier to the client system 18. From then on, the client system 10 includes its client identifier with all messages sent to the server system 18 so that the server system 18 can identify the particular client system 10 from which the message was sent.

The server system 18 comprises, as shown in FIG. 1, a web server 18a, a data base server 18b and an advertising server 18c. The server system 18 is front ended as described above, in that the user can access the system 18 by sending requests from the browser 12 via the communication link 16 to the web server 18a. The advertising server 18 is programmed to regulate the advertisements to be seen by the users. This can be done by storing the advertisement materials in the form of acceptable internet standards, i.e. banner ads, pop-ups, text ads and rich media, in corresponding databases 38, 40 and 42. The advertising server 18c is programmed to run the ads based on predetermined impressions, length of contract with the advertiser. This data is back ended, i.e. this data is input to the server system 18 via a media buy block 32.

The internet comprises a vast number of computers and computer networks that are interconnected through communication links such as the link 16 as shown in FIG. 1. The interconnected computers exchange information using various services, such as electronic mail, Gopher, and the World Wide Web ("WWW"). The WWW service allows a server computer system (i.e., Web server or Web site) to send graphical Web pages or screens of information such as the advertising materials to a remote client computer system 10. The remote client computer system 10 can then display the Web pages. Each resource (e.g., computer or Web page) of the WWW is uniquely identifiable by a Uniform Resource Locator ("URL"). To view a specific Web page in a request (e.g. a HyperText Transfer Protocol ("HTTP") request), the request is forwarded to the Web server 18a that supports that Web page 18a; when the Web server 18a receives the request, it sends that Web page to the client computer system 10. When the client computer system 10 receives that Web page, it typically displays the Web page using the browser 12. The browser 12 is a special-purpose application program that effects the requesting of Web pages and the displaying of Web pages.

Currently, Web pages are typically defined using HyperText Markup Language ("HTML"). HTML provides a standard set of tags that define how a Web page is to be displayed. When a user indicates to the browser 12 to display a Web page, the browser sends a request to the server computer system an HTML document that defines the Web page. When the requested HTML Document is received by the client computer system, the browser 12 displays the Web page or screen.

The World Wide Web is especially adapted to conducting electronic commerce and advertising. In an illustrated embodiment of this invention, the primary focus is on the advertising of the internet, which is a 5 billion dollar per quarter industry.

Advertising on the internet is created by and through the media property and content on the web property. The web property is marketed to a target audience who visits the web property to view the content provided. Every time an individual visits the web property, he/she creates an impression.

Referring now to FIG. 2, there is shown a preferred embodiment of the media production financing system 50 in accordance with the teachings of this invention. FIG. 2 shows the invention flow from a creative process 51 to the finished financed production media. The financing process 50 begins with the creative process 51, wherein the producer, who is defined as the manager of the development of the media production, seeks in step 52 to identify a screenplay to produce. Upon selecting of a screenplay that the producer feels would be well received in the marketplace, the producer constructs in step 54 a screenplay development budget for producing the screenplay into a media production, which may illustratively take the form of a film. The screenplay production budget defines the costs to take the screenplay and make it into the media production.

Once a budget is completed, the producer presents the finished creative process 51 to the company. The company is the owner or a licensee of the creative process. In an illustrative embodiment of this invention, the company has internal divisions to administer the creative process. A marketing department for example evaluates in step 58 the screenplay and determines in step 60 a target audience of potential viewers. The target audience includes a demographic, which comprises the age, sex and interests of that audience that would view the finished media production. For example as set forth in our current usage, we have included a site 130, which creates a demographic of individuals who would be interested in the movie industry and, therefore, a target audience for the advertisers within a community of targeted users. It also attracts a demographic of individuals in the 16-35 year range. Upon determining a target audience, the marketing team creates in step 62 a media property and then promotes it to attract potential targeted audience to access and view the media property. The media property comprises a description of the relevant target audience and the content carried by the media that could illustratively take the form of print, radio, television or as defined above in this financial media production process 50. When the media property is created in step 62, the marketing team begins to attract visitors to the media property creating impressions in step 64.

Ad Impression is defined by the Internet advertising bureau as the standard in internet advertising as a measurement of responses from an ad delivery system to an ad request from the user's browser 14, which is filtered from robotic activity and is recorded at a point as late as possible in the process of delivery of the advertising materials to the user's browser-therefore the closest to actual opportunity to see by the user.

In particular, an impression is a visitor to the website through access to the World Wide Web that visits a screen of the media property. These impressions create a commodity in the advertising community and are packaged by the sales team to be sold in step 66 to an advertiser.

The advertiser is an individual or company, which generally sells in step 68 a product or service, desires to market itself to the targeted audience and purchases the targeted impressions from the sales team at a predetermined media buy. A media buy defines a predetermined cost per impression, and the length of the contracts and ads to be displayed on the media property. The advertiser determines in step 72 the cost of the impressions and in step 78 creates and places the advertising materials on a screen of the media project. In the course of the financial process 50, the advertiser receives in step 71 additional added value benefits pre-determined in the media buy. These benefits result from the distribution in step 74 of the film and include movie association resulting from product placement, film interaction, branded entertainment, public relations value or other additional benefits to advertiser.

The media buy is then fulfilled by the company, as the terms of the media buy are completed. Once the media buy has been completed, the company will invoice in step 80 the advertiser for the cost of the media buy. The advertiser in step 82 now pays the invoice and the company takes the revenue generated and places it into the media production fund. The production fund in one illustrative embodiment is a bank account managed by the company. The fund then provides in step 84 the necessary funding to the producer as specified in his/her production development budget. The producer then uses these funds to finance the development of the screenplay into a finished production media.

Two methods are used to deliver ad content to the user-server-initiated and client-initiated. Server initiated ad counting uses the site's web content server 18a for making requests, formatting and re-directing content. Client-initiated ad counting relies on the user's browser 12 to perform these activities (in this case the term "client" refers to an internet user's browser 12). The standard method is a client-initiated approach of which the reference process 50 and for the sake of this description relies upon.

A valid impression may only be counted when an ad counter receives and responds to an HTTP request for a tracking asset from a client. The count must happen after the initiation of retrieval of underlying page content. Permissible implementation techniques include (but are not limited to) HTTP request generated by <IMG>, <FRAME>, or <SCRIPT SRC>. For client-side ad serving, the ad content itself could be treated as the tracking asset and the ad server itself could do the ad counting.

The response by the ad counter includes but is not limited to: Delivery of a "beacon", which may be defined as any piece of content designation as a tracking asset. Beacons commonly are in the form of 1×1 pixel image. Delivery of a "302" redirector or html/JavaScript (which doubles as a tracking asset) to any location, and delivery of ad content.

Measurement of any ad delivery may be accomplished by measuring the delivery of a tracking asset associated with the ad. The ad counter must employ standard header on the response, in order to minimize the potential of caching.

Each of these impressions has a value to them based on the audience and the value to the advertiser. Once a media property is created and visitors come to the media property site and there is a sufficient number of impressions to market the users to advertisers.

On the internet, the impression cost is based on guaranteeing/providing to the user on per thousand impressions or CPM. The average cost to the advertiser is 15$ per thousand impressions. A sales team of the company then markets the impressions on the website to the advertiser for a set number of impressions and cost in a media buy. A media buy sets the terms and cost of the advertising provided by the media property to the advertiser.

The media production finance process 50 then sells sufficient advertising to advertisers on the media property to obtain enough revenue for the cost of the budget provided by the producer. If the advertiser receives a standard media buy however, the funds generated from the media buy is placed into the media production fund that subsequently financed the media production.

It will thus be appreciated that the funding process of this invention is programmed to receive guaranteed impressions for selected media buys while having the advertiser's advertising dollars continue on to the project (e.g., media event) fund that is used to finance the desired project. A media outlet is identified that provides educational, entertaining and/or other informational content channels dealing with relevant subject matter. The media outlet is designed to generate impressions and/or consumers who are seeking information, help, education and/or entertainment with specific content. The consumers who access the media outlet produce an advertising commodity by creating impressions that may be sold to advertisers. A media outlet may include but is not limited to film, Television, Print, Internet (and a corresponding web site), Yellow Pages and other media outlets where the impressions are the circulation numbers as would be well known to those skilled in the art. The user is playing a part in the financing of what they consider a worthwhile project (e.g., the media event or other project that represents a social cause they consider important) by simply accessing (e.g., visiting and/or viewing the media outlet) and thereby getting content information. As will be explained in detail below, an impression is counted each time a user is exposed to the media content which may be (in the case of internet media outlet) a screen carrying certain advertising material. The potential impressions created by the consumer are sold as a commodity to the advertiser who is seeking targeted advertising to these consumers.

The net revenue paid by the advertiser is placed in a fund which is used to finance the selected project which may have subject matter of preference to the advertiser. Since the advertiser has received dollar for dollar advertising, there has been adequate consideration given for the money that funds the project and hence the funding model requires no dependence on the success of the project itself. As such, the risk associated with traditional investment models is eliminated. Furthermore, the pool of prospective fund contributors is greatly increased since there is no money out of pocket for the people visiting the media outlets who are incentivized to visit the media outlet simply due to their interest in the subject matter of the project.

Once the threshold number of people accessing the media outlets for a particular project has been reached, the media buy is considered complete and the money the advertiser paid for the media buy is transferred to the project fund with the advertiser having received the advertising value of their media buy purchase. For print, television and radio outlets, the media buy revenue may be collected up front, if desired, since there is guaranteed circulation associated with the media buy.

The media outlet provides content of interest to the audience (the people accessing the media outlets) which may be tied to the subject matter of the project. The media outlet is designed to attract consumers who are seeking help, education, entertainment or other information with specific content or interest to the consumer and thus also the advertisers. For example, the media outlet can be internet based, radio, television or print that has informational, educational and/or entertaining content dealing with the specific subject matter.

The user (i.e., the individual who will access the media outlet to view the content provided therein) is someone who has an interest in the subject matter of the project and hence also the media outlet which has been designed to tie-in with the subject matter of the project. The user can access the media outlet which provides an advertising commodity by creating impressions (or other quantifiable evidence of the consumer accessing the advertiser's media outlet regardless of medium) that are sold to advertisers. Thus, without spending any of their own money, the user is playing a major role in the funding of projects of interest to them by simply accessing the media outlet.

The net revenue paid by the advertiser for the media buys is placed in a fund and this fund is used to finance the project which has subject matter of preference to the advertiser. More specifically, the subject matter of the project may attract a demographic of viewers that is a target demographic of the advertiser's products and/or services. Since the advertiser has received benefit from the advertising that is equal to the value of the fees input into the fund, there is no risk involved in the financing of the project.

The creation and financing of projects in accordance with this invention may further allow the target media outlet viewers to be educated on personal and social issues. For example, the financing process of this invention may begin with a media outlet that provides the advertising materials that generates impressions from the user who is seeking information on a specific content channel within the media outlet. The impressions created by the consumer are then sold to the advertiser who is interested in targeting a particular user with products or services and the revenue that is created by the advertiser is placed into the fund that finances projects dealing with the content subject matter of interest.

A person, group or company that wants to finance a project dealing with a specific subject matter can advertise on the media outlet to the consumers who view the content and subject matter. The advertiser has purchased advertising at cost and therefore has received a value equal to the advertiser's investment. The advertiser's media buy money is then placed into the fund that finances the project and at no financial risk to the advertiser.

The method of financing a project in accordance with this invention allows an entity to finance these projects through advertising revenue. The process may begin with identifying a project in need of funding. The project administration verifies the budget required to finance the project, and provides the approved project fund amount to a marketing team. The marketing team reviews the project fund amount, the defined target audience and demographics of the defined audience.

The project may be any desired project, for example the media production financing system 50 described above with reference to FIG. 2, or other projects including, but not limited to, a non-profit related project, a business related project, a cause-related project, a real-estate related project and an art related project. Thus, the financing process 50 begins with the identification of the project 52 and the amount required to fund the project 54.

FIG. 2 shows the invention flow from a creative process 51 which identifies the project to be funded, to the finished financed production media. The financing process 50 begins with the creative process 51, wherein the project fund champion, who may be defined as the manager of the project, seeks in step 52 to identify a project to fund. Upon identification of a project that the project manager feels would be well received in the marketplace, the project manager constructs in step 54 a project development budget for producing the project. The project budget defines the costs to make the project fully funded and viable such that it may exist for its stated purpose beyond the time the fund target has been reached.

Once a budget is completed, the manager presents the finished creative process 51 to the company. The company is the owner or a licensee of the funding process. In the illustrative embodiment of this invention shown in FIG. 2, the Company evaluates in step 58 the project and determines in step 60 a target audience of potential viewers. The target audience may include a demographic, which comprises the age, sex and interests of that audience that would have an interest in the project. For example as set forth in our current usage, we have included a site 130, which creates a demographic of individuals who would be interested in the project and, therefore, a target audience for the advertisers within a community of targeted users. It may also attract a demographic of individuals in a specific age range. Upon determining a target audience, the marketing team creates in step 62 a media property and then promotes it to attract potential targeted audience to access and view the media property. The media property comprises a description of the relevant target audience and the content carried by the media that could illustratively take the form of print, radio, television or as defined above in this financial process 50. When the media property is created in step 62, the marketing team begins to attract visitors to the media property creating impressions in step 64.

In an internet media buy, the internet advertising media may be any internet advertising type (e.g., email marketing, search engine marketing, social media marketing, display advertising, and mobile advertising) using any desired internet advertising compensation model (e.g., CPM (Cost Per Mille), CPC (Cost per Click), CPA (Cost Per Action) and Fixed Cost).

For example, in display advertising, ad displays are usually called "impressions." An impression is defined by the Internet advertising bureau as the standard in internet advertising as a measurement of responses from an ad delivery system to an ad request from the user's browser 14, which is filtered from robotic activity and is recorded at a point as late as possible in the process of delivery of the advertising materials to the user's browser-therefore the closest to actual opportunity to see by the user. In the other types of media buys (print, radio, television, for example), impressions may be considered as the circulation numbers of the particular media buy outlet property type.

As an example, an impression may be a visitor to the website through access to the World Wide Web that visits a screen of the media property. These impressions create a commodity in the advertising community and are packaged by the sales team to be sold in step 66 to an advertiser. Again, in the other types of media properties (e.g., print, radio and television), circulation numbers are used to quantify and value the media buy associated with the chosen media property.

The advertiser is an individual, group or company which generally sells in step 68 a product or service, desires to market itself to the targeted audience and purchases the targeted impressions from the sales team at a predetermined media buy. In the above example, a media buy defines a predetermined cost per impression, and the length of the contracts and ads to be displayed on the media property. The advertiser determines in step 72 the cost of the impressions and in step 78 creates and places the advertising materials on a screen of the media project.

The media buy is then fulfilled by the Company, as the terms of the media buy are completed. Once the media buy has been completed (whether at the time of media buy purchase or at some later date), the advertiser may pay immediately or the Company may invoice in step 80 the advertiser for the cost of the media buy. In the invoices scenario, the advertiser in step 82 now pays the invoice and the company takes the revenue generated and places it into the project fund. The project fund in one illustrative embodiment is a bank account managed by the Company. The fund then provides in step 84 the necessary funding to the project owner as specified in his/her project development budget. The project owner then uses these funds to finance the development/production of the project.

As a further example, in the internet-based media buy, two methods may be used to deliver ad content to the user-server-initiated and client-initiated. Server initiated ad counting uses the site's web content server 18*a* for making requests, formatting and re-directing content. Client-initiated ad counting relies on the user's browser 12 to perform these activities (in this case the term "client" refers to an internet user's browser 12). The standard method is a client-initiated approach of which the reference process 50 and for the sake of this description relies upon.

In the above example, a valid impression may only be counted when an ad counter receives and responds to an HTTP request for a tracking asset from a client. The count must happen after the initiation of retrieval of underlying page content. Permissible implementation techniques include (but are not limited to) HTTP request generated by <IMG>, <FRAME>, or <SCRIPT SRC>. For client-side ad serving, the ad content itself could be treated as the tracking asset and the ad server itself could do the ad counting.

The response by the ad counter includes but is not limited to: Delivery of a "beacon", which may be defined as any piece of content designation as a tracking asset. Beacons commonly are in the form of 1×1 pixel image. Delivery of a "302" redirector or html/JavaScript (which doubles as a tracking asset) to any location, and delivery of ad content.

Measurement of any ad delivery may be accomplished by measuring the delivery of a tracking asset associated with the ad. The ad counter must employ standard header on the response, in order to minimize the potential of caching.

Each of these impressions has a value to them based on the audience and the value to the advertiser. Once a media property is created and visitors come to the media property site and there is a sufficient number of impressions to market the users to advertisers.

Continuing with the CPM example, the impression cost is based on guaranteeing/providing to the user on per thousand impressions or CPM. The average cost to the advertiser is 15$ per thousand impressions. A sales team of the company then markets the impressions on the website to the advertiser for a set number of impressions and cost in a media buy. A media buy sets the terms and cost of the advertising provided by the media property to the advertiser.

The media production finance process 50 then sells sufficient advertising to advertisers on the media property to obtain enough revenue for the cost of the project budget provided by the project owner. If the advertiser receives a standard media buy however, the funds generated from the media buy is placed into the project fund that subsequently financed the project.

Although the present invention has been described in terms of vanous embodiments, it is not intended that the invention be limited to these embodiments. Modification within the spirit of the invention will be apparent to those skilled in the art. The scope of the present invention is defined by the claims that follow.

What is claimed is:

1. A computer-implemented method comprising:
receiving, by one or more processors, from a given client, over an Internet-based communication link from a browsing application executed on the given client processor to the one or more processors, a message comprising data, the data comprising advertising material to populate on one or more websites;
identifying, by the one or more processors, the given client, based on receiving the message, an identifier, wherein the message comprises the identifier;
based on a message provided by a given client, generating, by the one or more processors, a webpage, wherein the generating comprises providing, via a graphical user interface of the webpage, a plurality of advertising buy options for selection by a given client accessing said webpage;
obtaining, by the one or more processors, via an input in the graphical user interface, a selection of one or more of the advertising buy options, wherein the selected one or more advertising buy options comprise at least one website of the respective websites and a predetermined number of impressions of the advertising material for users visiting the at least one website;
generating, by the one or more processors, on a database accessible to the one or more processors, a repository for advertising revenue based on the selection;
based on obtaining the selection, populating, by the one or more processors, the advertising material on the at least one website, wherein the populating comprises placing the advertising material within web property content of the at least one website;
monitoring, by the one or more processors, a number of impressions of the advertising material provided to users accessing the web property content displayed on the at least one website;
determining, by the one or more processors, whether an impression of the advertising material is valid, wherein the impression is valid based on a predetermined impression tracking system;

determining, by the one or more processors, that the number of valid impressions is greater than or equal to the predetermined number of impressions;

upon determining a number of valid impressions are met, ceasing, by the one or more processors, the populating of the advertising material on the at least one website; and based on determining a number of valid impressions are met, electronically collecting, by the one or more processors, a share of the advertising revenue to be transmitted to the web property content owner.

2. The computer-implemented method of claim 1, wherein the advertising materials are selected from the group consisting of: a banner ad, a pop-up, a text advertisement, and a rich media advertisement.

3. The computer-implemented method of claim 1, wherein the repository comprises a fund.

4. The computer-implemented method of claim 1, wherein the electronically collecting comprises applying the electronic revenue from the selected one or more advertising buy options, to the repository.

5. The computer-implemented method of claim 1, wherein the data comprises a project type.

6. The computer-implemented method of claim 5, wherein the project type is selected from the group consisting of: a non-profit project, a business project, a real estate project, and an art project.

7. The computer-implemented method of claim 1, further comprising:

receiving, by the one or more processors, from the given client, in the message, a target fund amount for the content.

8. The computer-implemented method of claim 1, further comprising:

prior to determining that the number of impressions is equal to the predetermined number of impressions, obtaining, by the one or more processors, via an input in the graphical user interface, a request for increasing the predetermined number of impressions of the advertising material for users visiting the at least one website; and based on the obtaining, automatically increasing the predetermined number of impressions.

9. The computer-implemented method of claim 1, wherein the data comprises a predetermined target audience, and wherein the at least one website comprises one or more websites frequented by the pre-determined target audience.

10. A computer program product comprising:

a computer readable storage medium readable by one or more processors and storing instructions for execution by the processor for performing a method comprising:

receiving, by the one or more processors, from a given client, over an Internet-based communication link from a browsing application executed on the given client processor to the one or more processors, a message comprising data, the data comprising advertising material to populate on one or more websites;

identifying, by the one or more processors, the given client, based on receiving the message, an identifier, wherein the message comprises the identifier;

based on a message provided by a given client, generating, by the one or more processors, a webpage, wherein the generating comprises providing, via a graphical user interface of the webpage, a plurality of advertising buy options for selection by a given client accessing said webpage;

obtaining, by the one or more processors, via an input in the graphical user interface, a selection of one or more of the advertising buy options, wherein the selected one or more advertising buy options comprise at least one website of the respective websites and a predetermined number of impressions of the advertising material for users visiting the at least one website;

generating, by the one or more processors, on a database accessible to the one or more processors, a repository for advertising revenue based on the selection;

based on obtaining the selection, populating, by the one or more processors, the advertising material on the at least one website, wherein the populating comprises placing the advertising material within web property content of the at least one website;

monitoring, by the one or more processors, a number of impressions of the advertising material provided to users accessing the web property content displayed on the at least one website;

determining, by the one or more processors, whether an impression of the advertising material is valid, wherein the impression is valid based on a predetermined impression tracking system;

determining, by the one or more processors, that the number of valid impressions is greater than or equal to the predetermined number of impressions;

upon determining a number of valid impressions are met, ceasing, by the one or more processors, the populating of the advertising material on the at least one website; and based on determining a number of valid impressions are met, electronically collecting, by the one or more processors, a share of the advertising revenue to be transmitted to the web property content owner.

11. The computer program product of claim 10, wherein the advertising materials are selected from the group consisting of: a banner ad, a pop-up, a text advertisement, and a rich media advertisement.

12. The computer program product of claim 10, wherein the repository comprises a fund.

13. The computer program product of claim 10, wherein the electronically collecting comprises applying the electronic revenue from the selected one or more advertising buy options, to the repository.

14. The computer program product of claim 10, wherein the data comprises a project type.

15. The computer program product of claim 14, wherein the project type is selected from the group consisting of: a non-profit project, a business project, a real estate project, and an art project.

16. The computer program product of claim 10, the method further comprising:

receiving, by the one or more processors, from the given client, in the message, a target fund amount for the content.

17. The computer program product of claim 10, further comprising:

prior to determining that the number of impressions is equal to the predetermined number of impressions, obtaining, by the one or more processors, via an input in the graphical user interface, a request for increasing the predetermined number of impressions of the advertising material for users visiting the at least one website; and based on the obtaining, automatically increasing the predetermined number of impressions.

18. The computer program product of claim 10,
wherein the data comprises a predetermined target audience, and
wherein the at least one website comprises one or more websites frequented by the pre-determined target audience.

19. A system comprising:
a memory;
one or more processors in communication with the memory; and
program instructions executable by the processor via the memory to perform a method,
the method comprising:
receiving, by the one or more processors, from a given client, over an Internet-based communication link from a browsing application executed on the given client processor to the one or more processors, a message comprising data, the data comprising advertising material to populate on one or more websites;
identifying, by the one or more processors, the given client, based on receiving the message, an identifier, wherein the message comprises the identifier;
based on a message provided by a given client, generating, by the one or more processors, a webpage, wherein the generating comprises providing, via a graphical user interface of the webpage, a plurality of advertising buy options for selection by a given client accessing said webpage;
obtaining, by the one or more processors, via an input in the graphical user interface, a selection of one or more of the advertising buy options, wherein the selected one or more advertising buy options comprise at least one website of the respective websites and a predetermined number of impressions of the advertising material for users visiting the at least one website;
generating, by the one or more processors, on a database accessible to the one or more processors, a repository for advertising revenue based on the selection;
based on obtaining the selection, populating, by the one or more processors, the advertising material on the at least one website, wherein the populating comprises placing the advertising material within web property content of the at least one website;
monitoring, by the one or more processors, a number of impressions of the
advertising material provided to users accessing the web property content displayed on the at least one website;
determining, by the one or more processors, whether an impression of the advertising material is valid, wherein the impression is valid based on a predetermined impression tracking system;
determining, by the one or more processors, that the number of valid impressions is greater than or equal to the predetermined number of impressions;
upon determining a number of valid impressions are met, ceasing, by the one or more processors, the populating of the advertising material on the at least one website; and
based on determining a number valid impressions are met, electronically collecting, by the one or more processors, a share of the advertising revenue to be transmitted to the web property content owner.

20. The system of claim 19, the method further comprising:
prior to determining that the number of impressions is equal to the predetermined number of impressions, obtaining, by the one or more processors, via an input in the graphical user interface, a request for increasing the predetermined number of impressions of the advertising material for users visiting the at least one website; and
based on the obtaining, automatically increasing the predetermined number of impressions.

* * * * *